United States Patent
Liu

(10) Patent No.: US 11,206,612 B2
(45) Date of Patent: Dec. 21, 2021

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/175,632

(22) Filed: Feb. 13, 2021

(65) Prior Publication Data
US 2021/0168707 A1    Jun. 3, 2021

Related U.S. Application Data

(63) Continuation of application No. PCT/CN2018/100518, filed on Aug. 14, 2018.

(51) Int. Cl.
| | | |
|---|---|---|
| *H04W 48/18* | (2009.01) | |
| *H04W 12/08* | (2021.01) | |
| *H04W 48/16* | (2009.01) | |
| *H04W 88/06* | (2009.01) | |

(52) U.S. Cl.
CPC ........... *H04W 48/18* (2013.01); *H04W 12/08* (2013.01); *H04W 48/16* (2013.01); *H04W 88/06* (2013.01)

(58) Field of Classification Search
CPC ..... H04W 48/18; H04W 48/16; H04W 88/06; H04W 12/08
See application file for complete search history.

(56) References Cited

U.S. PATENT DOCUMENTS

| | | | |
|---|---|---|---|
| 8,036,192 B2* | 10/2011 | Yaqub | H04W 36/00835 370/338 |
| 2006/0040661 A1 | 2/2006 | Choi et al. | |
| 2006/0221901 A1 | 10/2006 | Yaqub et al. | |
| 2012/0100853 A1 | 4/2012 | Xiong et al. | |

(Continued)

FOREIGN PATENT DOCUMENTS

| | | |
|---|---|---|
| CN | 101868001 | 10/2010 |
| CN | 102083174 | 6/2011 |

(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 15)," 3GPP TS 36.304, Jun. 2018, v15.0.0, 52 pages.

(Continued)

*Primary Examiner* — Julio R Perez
(74) *Attorney, Agent, or Firm* — Hodgson Russ LLP

(57) ABSTRACT

Embodiments of the present application provides a wireless communication and device. The method includes: determining, by a terminal device, a network type and/or network identity of a target network, the network type and/or network identity of the target network indicating whether the target network is a local network or a public land network, or indicating a local network type or local network identity of the target network as the local network; and performing, by the terminal device, communication through the target network.

16 Claims, 3 Drawing Sheets

200

Determining, by a terminal device, a network type and/or network identity of a target network, the network type and/or network identity of the target network indicating whether the target network is a local network or a public land network, or indicating a local network type or local network identity of the target network as the local network — 210

Performing, by the terminal device, communication through the target network — 220

(56) References Cited

U.S. PATENT DOCUMENTS

2015/0282042 A1 10/2015 Griot et al.
2019/0387028 A1* 12/2019 Aon ..................... H04L 65/102

FOREIGN PATENT DOCUMENTS

| CN | 102361513 | 2/2012 | |
|----|-----------|--------|---|
| CN | 107197453 | 9/2017 | |
| WO | WO-2009123598 A1 * | 10/2009 | ............ H04W 36/14 |
| WO | WO-2015196389 A1 * | 12/2015 | ............ H04W 60/04 |

OTHER PUBLICATIONS

"3rd Generation Partnership Project; Technical Specification Group Core Network and Terminals; Non-Access-Stratum (NAS) functions related to Mobile Station (MS) in idle mode (Release 15)," 3GPP TS 23.122, Jun. 2017, V15.0.0, 53 pages.
WIPO, ISR and WO for PCT/CN2018/100518, May 17, 2019.
EPA, Extended European Search Report for Application No. 18930108.8, dated Jun. 28, 2021.

* cited by examiner

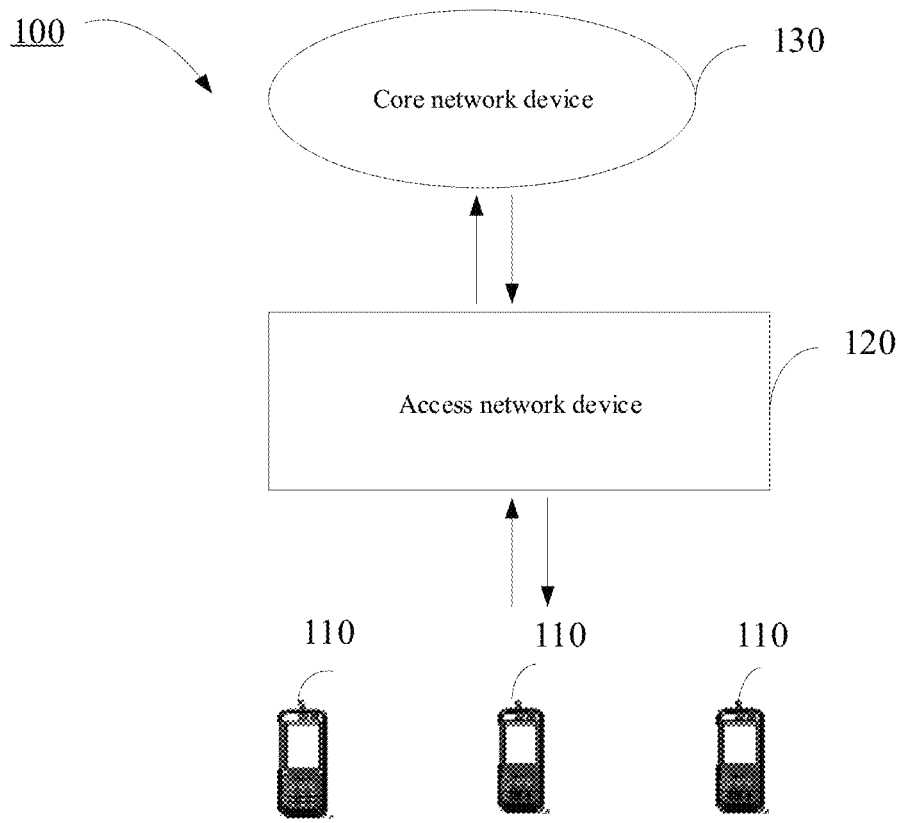

Determining, by a terminal device, a network type and/or network identity of a target network, the network type and/or network identity of the target network indicating whether the target network is a local network or a public land network, or indicating a local network type or local network identity of the target network as the local network — 210

Performing, by the terminal device, communication through the target network — 220

FIG. 2

WIRELESS COMMUNICATION METHOD AND TERMINAL DEVICE

CROSS-REFERENCE TO RELATED APPLICATIONS

The present application is a continuation of International Application No. PCT/CN2018/100518, filed on Aug. 14, 2018, the entire disclosure of which is hereby incorporated by reference.

TECHNICAL FIELD

Embodiments of the present application relate to the field of communication technology, and more specifically, to a wireless communication method and a terminal device.

BACKGROUND

In a communication system, a public network system, i.e., a public land system based on a public land mobile network (PLMN), is usually deployed.

But in some scenarios, for example, in an office scenario, home scenario, and factory, a public network system may not be managed effectively and safely.

SUMMARY

A first aspect provides a wireless communication method, including: determining, by a terminal device, a network type and/or network identity of a target network, the network type and/or network identity of the target network indicating whether the target network is a local network or a public land network, or indicating a local network type or local network identity of the target network as the local network; and performing, by the terminal device, communication through the target network.

A second aspect provides a terminal device for executing the method in the above first aspect.

Specifically, the terminal device includes a functional module for executing the method in the above first aspect.

A third aspect provides a terminal device including a processor and a memory. The memory is configured to store a computer program, and the processor is configured to call and run the computer program stored in the memory to execute the method in the above first aspect.

A fourth aspect provides a chip for implementing the method in the above first aspect.

Specifically, the chip includes a processor, configured to call and run a computer program from a memory, so that a device installed with the chip executes the method in the above first aspect.

A fifth aspect provides a computer-readable storage medium for storing a computer program that causes a computer to execute the method in the above first aspect.

A sixth aspect provides a computer program product including computer program instructions that cause a computer to execute the method in the above first aspect.

A seventh aspect provides a computer program that, when being run on a computer, causes the computer to execute the method in the above first aspect.

BRIEF DESCRIPTION OF THE DRAWINGS

FIG. 1 is a schematic diagram of a communication system architecture according to an embodiment of the present application.

FIG. 2 is a schematic diagram of a wireless communication method according to an embodiment of the present application.

DETAILED DESCRIPTION

Figure 3:
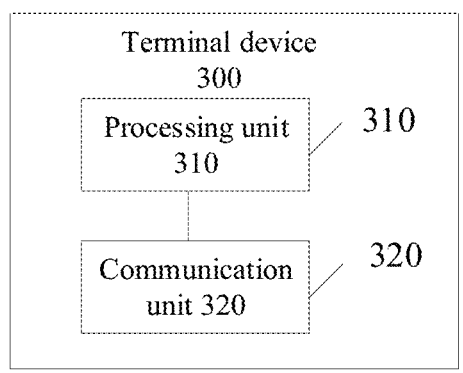
FIG. 3 is a schematic block diagram of a terminal device according to an embodiment of the present application.

The technical solutions in the embodiments of the present application will be described below in conjunction with the drawings in the embodiments of the present application. Obviously, the described embodiments are a part but not all of the embodiments of the present application. Based on the embodiments in the present application, all other embodiments obtained by those of ordinary skill in the art without creative work shall fall within the protection scope of the present application.

The technical solutions of the embodiments of the present application may be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) system, a 5G system or the like.

Exemplarily, FIG. 1 shows a communication system 100 applied in an embodiment of the present application. The communication system 100 may include a terminal device 110, which may be within the coverage area of an access network device 120. As used herein, the "terminal device" includes, but is not limited to, being connected via a wired line, such as a public switched telephone network (PSTN), a digital subscriber line (DSL), a digital cable, and a direct cable; and/or another data connection/network; and/or a wireless interface, for example, for a cellular network, a wireless local area network (WLAN), a digital TV network such as a DVB-H network, a satellite network, and an AM-FM broadcast transmitter; and/or a device of another terminal device that is configured to receive/send communication signals; and/or an internet of things (IoT) device. A terminal device configured to communicate through a wireless interface may be referred to as a "wireless communication terminal", a "wireless terminal" or a "mobile terminal". Examples of the mobile terminal include, but are not limited to, a satellite or cellular phone; a personal communications system (PCS) terminal that can combine a cellular radio phone with data processing, fax, and data communication capabilities; a PDA that can include a radio phone, a pager, an internet/intranet access, a Web browser, a notepad, a calendar, and/or a global positioning system (GPS) receiver; and a conventional laptop and/or palmtop receiver or other electronic devices including a radio telephone transceiver. The terminal device may refer to an access terminal, user equipment (UE), a user unit, a user station, a mobile station, a mobile radio station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, an in-vehicle device, a wearable device, a terminal device in the 5G network, a terminal device in the future evolution PLMN or the like.

The communication system 100 may include an access network device 120, and the access network device 120 may be a device that communicates with the terminal device 110 (or called a communication terminal or a terminal). The access network device 120 may provide communication coverage for a specific geographic area, and may communicate with terminal devices within the coverage area. Optionally, the access network device 120 may be a base transceiver station (BTS) in the GSM or CDMA system, a NodeB (NB) in the WCDMA system, an evolutional Node B (eNB or eNodeB) in the LTE system, or a wireless controller in a cloud radio access network (CRAN), or the network device may be a mobile switching center, a relay station, an access point, an in-vehicle device, a wearable device, a hub, a switch, a network bridge, a router, and a network side device in the 5G network or a network side device in the future evolution public land mobile network (PLMN).

The wireless communication system 100 further includes a core network device 130 that communicates with the access network device. Optionally, the core network device 130 may be a 5G core network device, for example, access and mobility management function (AMF), which is used for access and mobility management, and has functions of user authentication, switching, location update and the like; for another example, session management function (SMF), which is responsible for session management including establishment, modification, and release of packet data unit (PDU) sessions and the like; for another example, user plane function (UPF), which is responsible for forwarding user data. The core network device may be a core network device of an LTE system or other systems.

Optionally, there may be a device-to-device (D2D) communication between the terminal devices 110.

Optionally, the 5G system or 5G network may further be referred to as a new radio (NR) system or NR network.

It shall be understood that the terms "system" and "network" are often used interchangeably herein. The term "and/or" herein is merely an association relationship describing associated objects, indicating that there may be three relationships. For example, A and/or B may indicate that A exists alone, both A and B exist, and B exists alone. In addition, the character "I" herein generally indicates that associated objects before and after the same are in an "or" relationship.

FIG. 2 is a schematic flowchart of a wireless communication method 200 according to an embodiment of the present application.

In 210, a terminal device determines a network type and/or network identity of a target network, the network type and/or network identity of the target network indicating whether the target network is a local network or a public land network, or indicating a local network type or local network identity of the target network as the local network.

Optionally, in an embodiment of the present application, the target network includes an access network and/or a core network, which means that the embodiment of the present application may be applied to determine the network type and/or network identity of the access network and/or core network to be accessed.

Optionally, the network type and/or network identity mentioned in the embodiment of the present application may be the network type and/or network identity of the core network, or the network type and/or network identity of the access network.

It shall be understood that the embodiments of the present application may not distinguish between the access network and the core network, that is, the target network selected by the terminal device includes the access network and the core network by default. For example, if a selected network type is the local network, the access network and core network of the local network are used for communication.

Optionally, in an embodiment of the present application, the network type includes the local network and the public land network.

The public land network may be a public land network based on PLMN.

A local network may also be referred to as a local area network or a private network. The local network is usually deployed in an office scenario, home scenario, and factory, and may realize more effective and safe management. Usually, a local user or manager may deploy the local network. Generally, a user who is authorized and capable of accessing the local network is allowed to access the local network.

The local network may be managed or governed by the public land network, or may not be managed or governed by the public land network.

Optionally, the local network may use an unlicensed frequency band for communication, or may share a licensed frequency band with the public land network.

Optionally, the local network may be a network belonging to the 3GPP. The core network of the local network may be a NR or LTE core network, and the local network may access the core network through an NR access network, an LTE access network or a wireless fidelity (Wifi).

Optionally, in an embodiment of the present application, the public land network and the local network may share the core network, and the access network is independent. Alternatively, the public land network and the local network may share the access network, and the core network is independent. Alternatively, the public land network and the local network may share both the access network and the core network. Alternatively, both the access network and core network are not shared by the public land network and the local network.

Optionally, in an embodiment of the present application, a plurality of local networks or multiple kinds of local networks may share the core network, and the access network is independent. Alternatively, the plurality of local networks or multiple kinds of local networks may share the access network, and the core network is independent. Alternatively, the plurality of local networks or multiple kinds of local networks may share both the access network and core network. Alternatively, both the access network and core network are not shared by the plurality of local networks or multiple kinds of local networks.

Optionally, as for the local network, the network type thereof is divided according to whether it may have a roaming relationship and an interoperability relationship with the public land network.

For example, the local network may be divided into the following network types: a local network that has the roaming relationship and interoperability relationship with the public land network, and a local network that has the roaming relationship with the public land network but does not have the interoperability relationship with the public land network, a local network that has the interoperability relationship with the public land network but does not have the roaming relationship with the public land network, and a local network that does not have the interoperability relationship and roaming relationship with the public land network.

The roaming relationship between the local network and the public land network may mean that the terminal device adopts the public land network in a certain area, and when roaming to another area, may adopt the local network; or the terminal device adopts the local network in a certain area, and when roaming to another area, may adopt the public land network.

At this time, the local network belongs to the public land network, and the network identity of the local network may specifically carry the PLMN of the public land network. However, the local network may not belong to the public land network.

Optionally, the interoperability relationship between the local network and the public land network may mean that the terminal device may use the local network to influence communication behavior between the terminal device and the public land network; or the terminal device may use the public land network to influence the communication behavior between the terminal device and the local network.

At this time, the local network belongs to the public land network, and the network identity of the local network may specifically carry the PLMN of the public land network. However, the local network may not belong to the public land network.

It shall be understood that in most embodiments of the present application, it illustrates as an example that the network type and/or network identity of the target network indicates whether the target network is the local network or the public land network, but the embodiments of the present application are not limited thereto. The network type and/or network identity of the target network may indicate which network or type of a plurality of local networks or multiple types of local networks the target network is, but may not indicate whether the target network is the local network or the public land network.

Alternatively, the network type and/or network identity of the target network may indicate whether the target network is the local network or the public land network, and in such case, when the network type and/or network identity of the target network indicate that the target network is the local network, the network type and/or network identity of the target network may further indicate which network or type of a plurality of local networks or multiple types of local networks the target network is.

Optionally, in an embodiment of the present application, when the network is the local network, the network identity of the network may include local network identity information.

Further, the network identity includes at least one of: information of an involved/belonged PLMN, information of the local network type, information for indicating being the local network, and location area information.

If the network identity includes only the local network identity part, it means that the local network identity may be globally unique; and if the network identity further includes other parts, it means that the local network identity part is not globally unique, and the network identity may become globally unique by combining the information of the other parts.

The PLMN information included in the network identity may mean that when the local network is managed or governed by the public land network, the PLMN may be the PLMN of the public land network.

The type information of the local network included in the network identity may indicate whether the local network and the public land network have a roaming relationship and/or an interoperability relationship.

The information included in the network identity for indicating being the local network may mean that there is a special field in the network identity for indicating that the network identity is an identity of the local network.

The location area information included in the network identity may be an identity for indicating which area the network identity belongs to.

In order to facilitate understanding, the composition of the network identity is described below in conjunction with several implementations:

1. PLMN information+local network identity information, where the local network identity information is unique in the PLMN;

2. PLMN information+local network identity information+local network type information, where the local network identity information is in the PLMN and is unique in a specific local network type;

3. PLMN information+local network identity information+location area information, where the local network identity information is unique in a specific location area in the PLMN;

4. PLMN information+local network identity information+local network type information+location area information, where the local network identity information is in a specific location area in the PLMN and is unique in a specific local network type;

5. Local network identity, where the local network identity is globally unique, and the network type may be obtained through the network identity;

6. Local network identity+local network type, where the local network identity is globally unique in a specific local network type;

7. Local network identity+location area information, where the local network identity is unique in a specific location area; and 8. Local network identity+local network type+location area information, where the local network identity is in a specific location area and is unique in a specific local network type.

Optionally, in an embodiment of the present application, when the terminal device supports simultaneous access to at least two networks, the network type and/or network identity of the target network includes the network types and/or network identities of the at least two networks.

Optionally, in an embodiment of the present application, the terminal device may determine the network type and/or network identity of the target network based on at least one of:

the network type and/or network identity supported or authorized by the terminal device, the network type and/or network identity supported by a current network, and current location information of the terminal device.

For example, a core network type and/or core network identity of the target network may be determined based on at least one of: the core network type and/or core network identity supported or authorized by the terminal device, the core network type and/or core network identity supported by the current network, and current location information of the terminal device.

For example, an access network type and/or access network identity of the target network may be determined based on at least one of: the access network type and/or access network identity supported or authorized by the terminal device, the access network type and/or access network identity supported by the current network, and current location information of the terminal device.

For example, the core network type and/or core network identity of the target network may be determined based on at least one of: the access network type and/or access network identity supported or authorized by the terminal device, the access network type and/or access network identity supported by the current network, and current location information of the terminal device.

At this time, the terminal device may determine the type of the access network to be used based on at least one of the access network type and/or access network identity supported or authorized by the terminal device, the access network type and/or access network identity supported by the current network, and current location information of the terminal device, and may determine the type and/or identity of the core network to be used based on the type and/or identity of the access network to be used.

For example, the access network type and/or access network identity of the target network may be determined based on at least one of: the core network type and/or core network identity supported or authorized by the terminal device, the core network type and/or core network identity supported by the current network, and current location information of the terminal device, for example, the access networks with different types and/or identities may correspond to the core networks with different types and/or identities.

At this time, the terminal device may determine the type and/or identity of the core network to be used based on at least one of the core network type and/or core network identity supported or authorized by the terminal device, the core network type and/or core network identity supported by the current network, and current location information of the terminal device, and may determine the type and/or identity of the access network to be used based on the type and/or identity of the core network to be used, for example, the core networks with different types and/or identities may correspond to the access networks with different types and/or identities.

For example, the terminal device determines the target network type and/or target network identity based on at least one of the network type and/or network identity supported or authorized by the terminal device, the network type and/or network identity supported by the current network, and current location information of the terminal device, and thus communicates based on the access network and the core network of the target network corresponding to the determined network type and/or network identity.

The network type and/or network identity supported or authorized by the terminal device may be pre-configured on the terminal device. There may be a plurality of network types and/or network identities supported or authorized by the terminal device, from which the terminal device may select one or more network types and/or network identities. Specifically, the one or more network types and/or network identities may be selected randomly, or according to a priority ranking (which may be pre-configured on the terminal device by contract, or configured by the network device, or pre-configured by a user manually, or determined according to user's historical selection), or in conjunction with other information (for example, the network type and/or network identity supported by the current network, and the current location information of the terminal device).

The network type and/or network identity supported by the current network may be the network type and/or network identity supported in a current area at current time, and the terminal may select the target network based only on the network type and/or network identity supported by the current network. The target network may also be selected in combination with other information (for example, the network type and/or network identity authorized or supported by the terminal device, and the current location information of the terminal device).

The terminal device may determine the network type and/or network identity supported by the current network based on a cell currently accessed.

That is, after performing cell search and residence, the terminal device determines the network type and/or network identity supported by the current network based on the resided cell.

In an implementation, the terminal device reads the network type and/or network identity supported by the current network from system information of the cell accessed currently.

Specifically, the network device may broadcast which network types and/or network identities that the current cell supports in the system information of the cell, so that the terminal device may determine the network type and/or network identity supported by the current network from the system information of the cell to select the target network.

The system information may indicate that the current network supports a plurality of network types and/or network identities, so that the terminal device may select the network type and/or network identity in combination with other information.

The system information indicating that the current network supports a plurality of network types and/or network identities may mean that the currently accessed cell may be used as the access network for a plurality of network types (for example, the local network and the public land network), or may be used as the access network for a plurality of local network types (for example, the local network that supports roaming and the local network that supports interoperability) or a plurality of local networks (for example, a plurality of local networks that support roaming).

After the terminal device selects one of the network types and/or network identities, the cell may serve as the access network corresponding to the network type and/or network identity to serve the terminal device.

In another implementation, the terminal device determines the network type and/or network identity supported by the current network based on frequency information of the cell accessed currently.

Specifically, the terminal device may determine the network type and/or network identity supported by the current network, based on a correspondence between at least one piece of the frequency information and at least one of the network type and/or network identity and the frequency information of the cell accessed currently.

After the network type and/or network identity supported by the current network are determined, the network identity and/or network type of the target network are determined based the network selection.

For example, the target network may be selected in combination with the network identity and/or network type supported or authorized by the terminal device, and/or the location information of the terminal device.

For another example, the target network may be selected based on a priority ranking of the network type and/or network identity supported by the current network, and the priority ranking may be read from system information, or may be preset on the terminal device.

It shall be understood that it describes above that the target network device may be selected in combination with the network identity and/or network type supported or authorized by the terminal device, and/or the location information of the terminal device after the network identity and/or network type supported by the current network are determined, however the embodiment of the present application is not limited thereto.

For example, before determining the network type and/or network identity supported by the current network based on the cell accessed currently, the terminal device determines a cell to be accessed currently and performing cell access, based on the network type and/or network identity supported or authorized by the terminal device and/or the network type and/or network identity supported by current location of the terminal device, and performs cell access.

Specifically, the terminal device may determine frequency band information of the cell to be accessed based on the network type and/or network identity supported or authorized by the terminal device and/or the network type and/or network identity supported by the current location of the terminal device, and based on the correspondence between the network type and/or network identity and the frequency band information, and performs the cell access. After accessing the cell, the terminal device may determine the network type and/or network identity supported by the current network based on the cell, and on this basis, select the target network.

Determining the frequency band information of the cell to be accessed based on the network type and/or network identity supported or authorized by the terminal device and/or the network type and/or network identity supported by the current location of the terminal device may mean that the network type and/or network identity supported by the network corresponding to the cell to be accessed meet the requirement of the terminal device (for example, the network type and/or network identity supported or authorized by the terminal device). Determining the network type and/or network identity supported by the network after accessing the cell means that on the basis of meeting the requirement of the terminal device, the target network that meets the network requirement is searched.

Optionally, the current location information of the terminal device may indicate a current location area of the terminal device, based on which, the target network is selected. The location area may be a cell, a tracking area, or an area of other size (for example, an administrative area, etc.).

The network type and/or network identity of the target network are determined based on the location area where the terminal device is currently located, and the correspondence between at least one of the location area and at least one of the network type and/or network identity.

The correspondence between at least one of the location area and at least one of the network type and/or network identity may be pre-configured on the terminal device. Specifically, the correspondence between at least one of the location area and at least one of the network type and/or network identity may be pre-configurated by contract, manually by a user manual, or by the network side. Alternatively, the correspondence may be determined based on the user's historical information. For example, a specific network type and/or network identity used in a certain location area may be recorded on the terminal device for subsequent target network selection.

Optionally, in an embodiment of the present application, the network type and/or network identity supported by the current network correspond to the frequency band. The terminal searches a suitable cell on a specific frequency band and can reside on it. The terminal device may determine the network type and/or network identity of the resided cell (or base station) according to the correspondence between the network type and/or network identity supported by the pre-configured network and the frequency band.

It shall be understood that in an embodiment of the present application, the target network device may be selected based on other information in addition to at least one of the network type and/or network identity supported or authorized by the terminal device, the network type and/or network identity supported by the current network, and the current location information of the terminal device, for example, based on time information. For example, the network type and/or network identity adopted by the terminal device are different at different times.

In 220, the terminal device performs communication through the target network.

The communication performed by the terminal device through the target network may include uplink and downlink transmission and/or preparations for the uplink and downlink transmission implemented by the terminal device through the target network.

The communication may include but is not limited to at least one of: registration, cell search, cell residence, and uplink and downlink data transmission.

Optionally, in an embodiment of the present application, frequency information corresponding to the network type and/or network identity of the target network is determined, and the cell search and residence are performed based on the determined frequency information.

Specifically, after selecting the network type and/or network identity, the terminal device may determine the cell that needs to be searched and resided based on the correspondence between the network type and/or network identity and the frequency information, and perform the cell search on the cell.

Therefore, in the embodiments of the present application, the terminal device determines the network type and/or network identity of the target network, the network type and/or network identity of the target network indicating whether the target network is the local network or the public land network, or indicating the local network type or local network identity of the target network as the local network; and the terminal device performs communication through the target network. Therefore, the terminal device may flexibly select the local network or the public land network as the network for communication (for example, based on the communication requirement for communication security), so that the communication requirement for communication security can be met and communication performance can be improved.

FIG. 3 is a schematic block diagram of a terminal device 300 according to an embodiment of the present application. The terminal device 300 may include a processing unit 310 and a communication unit 320.

The processing unit 310 is configured to determine a network type and/or network identity of a target network, the network type and/or network identity of the target network indicating whether the target network is a local network or a public land network, or indicating a local network type or local network identity of the target network as the local network; and The communication unit 320 is configured to perform communication through the target network.

Optionally, in an embodiment of the present application, the processing unit 310 is further configured to:

determine the network type and/or network identity of the target network based on at least one of:

the network type and/or network identity supported or authorized by the terminal device, the network type and/or network identity supported by a current network, and current location information of the terminal device.

Optionally, in an embodiment of the present application, the processing unit 310 is further configured to:

determine the network type and/or network identity supported by the current network based on a cell accessed currently.

Optionally, in an embodiment of the present application, the processing unit 310 is further configured to:

read the network type and/or network identity supported by the current network from system information of the cell accessed currently.

Optionally, in an embodiment of the present application, the processing unit 310 is further configured to:

determine the network type and/or network identity supported by the current network based on frequency information of the cell accessed currently.

Optionally, in an embodiment of the present application, the processing unit 310 is further configured to:

determine the network type and/or network identity supported by the current network, based on a correspondence between at least one piece of the frequency information and at least one of the network type and/or network identity and the frequency information of the cell accessed currently.

Optionally, in an embodiment of the present application, the processing unit 310 is further configured to:

determine a cell to be accessed currently based on the network type and/or network identity supported or authorized by the terminal device and/or the network type and/or network identity supported by current location of the terminal device, and based on the correspondence between at least one of the network type and/or network identity and at least one piece of the frequency information, and perform cell access.

Optionally, in an embodiment of the present application, the processing unit 310 is further configured to:

determine the network type and/or network identity of the target network based on a location area where the terminal device is currently located and a correspondence between at least one of the location area and at least one of the network type and/or network identity.

Optionally, in an embodiment of the present application, the communication unit 320 is further configured to:

determine frequency information corresponding to the network type and/or network identity of the target network; and perform cell search and residence based on the frequency information determined.

Optionally, in an embodiment of the present application, when the terminal device supports simultaneous access to at least two networks, the network type and/or network identity of the target network includes the network types and/or network identities of the at least two networks.

Optionally, in an embodiment of the present application, when the target network is the local network, the network type and/or network identity of the target network further indicate whether the target network and the public land network have interoperability and/or a roaming relationship or not.

Optionally, in an embodiment of the present application, when the target network is the local network, the network identity includes local network identity information.

Optionally, in an embodiment of the present application, the network identity includes at least one of: information of an involved PLMN, information of the local network type, information for indicating being the local network, and location area information.

It shall be understood that the terminal device 300 may be configured to implement various methods in the method embodiment 200 of the present application, which will not be repeated here for the sake of brevity.

Figure 4:
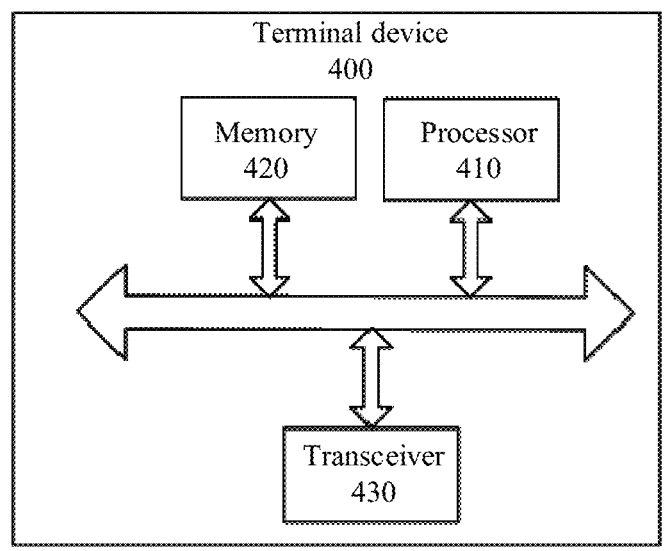
FIG. 4 is a schematic block diagram of a terminal device according to an embodiment of the present application.

FIG. 4 is a schematic structural diagram of a terminal device 400 according to an embodiment of the present application. The terminal device 400 shown in FIG. 4 includes a processor 410, and the processor 410 can call and run a computer program from a memory to implement the method in the embodiment of the present application.

Optionally, as shown in FIG. 4, the terminal device 400 may further include a memory 420. The processor 410 may call and run the computer program from the memory 420 to implement the method in the embodiment of the present application.

The memory 420 may be a separate device independent of the processor 410, or may be integrated in the processor 410.

Optionally, as shown in FIG. 4, the terminal device 400 may further include a transceiver 430, and the processor 410 may control the transceiver 430 to communicate with other devices, specifically, to send information or data to other devices or to receive information or data sent by the other devices.

The transceiver 430 may include a transmitter and a receiver. The transceiver 430 may further include an antenna, and the number of antennas may be one or more.

Optionally, the terminal device 400 may implement the corresponding process implemented by the terminal device in each method of the embodiment of the present application, which will not be repeated here for the sake of brevity.

Figure 5:
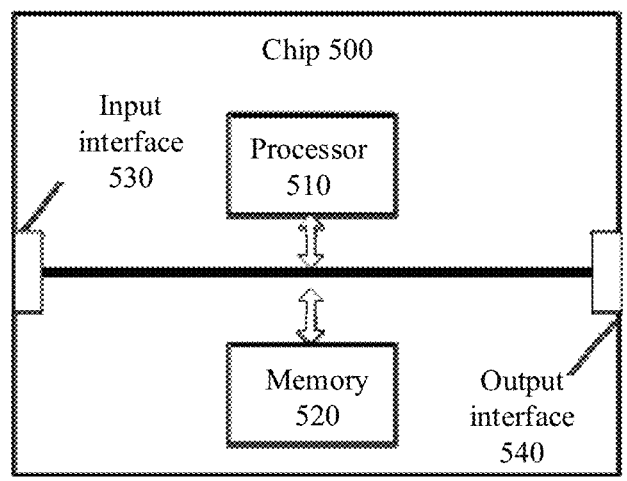
FIG. 5 is a schematic block diagram of a chip according to an embodiment of the present application.

FIG. 5 is a schematic structural diagram of a chip according to an embodiment of the present application. The chip 500 shown in FIG. 5 includes a processor 910, and the processor 910 can call and run a computer program from a memory to implement the method in the embodiment of the present application.

Optionally, as shown in FIG. 5, the chip 500 may further include a memory 520. The processor 510 may call and run the computer program from the memory 520 to implement the method in the embodiment of the present application.

The memory 520 may be a separate device independent of the processor 510, or may be integrated in the processor 510.

Optionally, the chip 500 may further include an input interface 530. The processor 510 can control the input interface 530 to communicate with other devices or chips, specifically, to obtain information or data sent by other devices or chips.

Optionally, the chip 500 may further include an output interface 540. The processor 510 can control the output interface 540 to communicate with other devices or chips, specifically, to output information or data to other devices or chips.

Optionally, the chip can be applied to the terminal device in the embodiment of the present application, and the chip can implement the corresponding process implemented by the terminal device in each method of the embodiment of the present application, which will not be repeated here for the sake of brevity.

It shall be understood that the chip mentioned in the embodiment of the present application may also be referred to as system-on-chip or the like.

Figure 6:
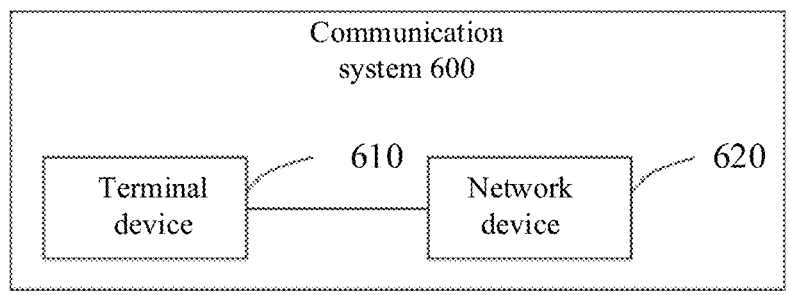
FIG. 6 is a schematic block diagram of a communication system according to an embodiment of the present application.

FIG. 6 is a schematic block diagram of a communication system 600 according to an embodiment of the present application. As shown in FIG. 6, the communication system 600 includes a terminal device 610 and a network device 620.

The terminal device 610 may implement the corresponding function implemented by the terminal device in above method, and the network device 620 may implement the corresponding function implemented by the network device in above method, which will not be repeated here for the sake of brevity.

It shall be understood that the processor in an embodiment of the present application may be an integrated circuit chip with signal processing capability. In the implementation process, the steps of the foregoing method embodiments may be completed by integrated logic circuits in the form of hardware in the processor or instructions in the form of software. The above-mentioned processor may be a general-purpose processor, a digital signal processor (DSP), an application specific integrated circuit (ASIC), a field programmable gate array (FPGA) or other programmable logic devices, a discrete gate or transistor logic device, and a discrete hardware component. The methods, steps, and logical block diagrams disclosed in the embodiments of the present application may be implemented or executed. The general-purpose processor may be a microprocessor or any conventional processor. The steps of the method disclosed in the embodiments of the present application may be directly embodied as being executed and completed by a hardware decoding processor or by a combination of hardware and software modules in the decoding processor. The software module can be located in a mature storage medium in the field such as a random memory, a flash memory, a read-only memory, a programmable read-only memory, electrically erasable programmable memory, and a register. The storage medium is located in the memory, and the processor reads the information in the memory and completes the steps of the above method in combination with the hardware thereof.

It can be understood that the memory in an embodiment of the present application may be a volatile memory or a non-volatile memory, or may include both volatile and non-volatile memories. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example but not limitation, there are a lot of available RAMs, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It shall be noted that the memory in the system and method described herein is intended to include, but is not limited to, these and any other suitable types of memories.

It shall be understood that the foregoing memory is exemplary but not restrictive. For example, the memory in an embodiment of the present application may also be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a direct rambus RAM (DR RAM) and the like. That is, the memory in the embodiment of the present application is intended to include, but is not limited to, these and any other suitable types of memories.

An embodiment of the present application also provides a computer-readable storage medium for storing computer programs.

Optionally, the computer-readable storage medium may be applied to the network device in the embodiment of the present application, and the computer program causes a computer to execute the corresponding process implemented by the network device in each method of the embodiment of the present application, which will not be repeated here for the sake of brevity.

Optionally, the computer-readable storage medium may be applied to the mobile terminal/terminal device in the embodiment of the present application, and the computer program causes a computer to execute the corresponding process implemented by the mobile terminal/terminal device in each method of the embodiment of the present application, which will not be repeated here for the sake of brevity.

An embodiment of the present application also provides a computer program product including computer program instructions.

Optionally, the computer program product may be applied to the network device in the embodiment of the present application, and the computer program instructions cause a computer to execute the corresponding process implemented by the network device in each method of the embodiment of the present application, which will not be repeated here for the sake of brevity.

Optionally, the computer program product may be applied to the mobile terminal/terminal device in the embodiment of the present application, and the computer program instructions cause a computer to execute the corresponding process implemented by the mobile terminal/terminal device in each method of the embodiment of the present application, which will not be repeated here for the sake of brevity.

An embodiment of the present application also provides a computer program.

Optionally, the computer program may be applied to the network device in the embodiment of the present application, and the computer program, when being run on a computer, causes the computer to execute the corresponding process implemented by the network device in each method of the embodiment of the present application, which will not be repeated here for the sake of brevity.

Optionally, the computer program may be applied to the mobile terminal/terminal device in the embodiment of the present application, and the computer program, when being run on a computer, causes the computer to execute the corresponding process implemented by the mobile terminal/terminal device in each method of the embodiment of the present application, which will not be repeated here for the sake of brevity.

Those skilled in the art may realize that the unit and algorithm step of the examples described in combination with the embodiments disclosed herein can be implemented by electronic hardware, or a combination of computer software and electronic hardware. Whether these functions are executed by hardware or software depends on the specific application and design constraints of the technical solution. Professionals and technicians can use different methods for each specific application to implement the described functions, but such implementation shall not be considered as going beyond the scope of the present application.

Those skilled in the art can clearly understand that, for convenience and concise description, the specific working process of the above-described system, device, and unit can refer to the corresponding process in the foregoing method embodiment, which will not be repeated herein.

In several embodiments provided by present application, it shall be understood that the disclosed system, device, and method may be implemented in other ways. For example, the device embodiment described above is only illustrative. For example, the division of unit is only a logical function division, and there may be other division methods in actual implementation, for example, a plurality of units or components may be combined or may be integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may be or may not be physically separated, and the components displayed as units may be or may not be physical units, that is, they may be located in one place, or they may be distributed on a plurality of network units. Some or all of the units may be selected according to actual needs to achieve the objectives of the solutions of the embodiments.

In addition, the functional units in each embodiment of the present application may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present application essentially or a part that contributes to the prior art or a part of the technical solution can be embodied in the form of a software product, and the computer software product is stored in a storage medium, and includes several instructions to cause a computer device (which may be a personal computer, a server, a network device or the like) to execute all or part of the steps of the methods described in the various embodiments of the present application. The above storage media includes a U disk, a mobile hard disk, a read-only memory (ROM), a random access memory (RAM), a magnetic disk, an optical disk and other media that can store program codes.

The above are only specific implementations of the present application, and the protection scope of the present application is not limited thereto. Any person skilled in the art can easily conceive of changes or substitutions within the technical scope disclosed in the present application, which shall fall within the protection scope of the present application. Therefore, the protection scope of the present application shall be subject to the protection scope of the claims.

What is claimed is:

1. A wireless communication method, wherein the method comprises:
   determining, by a terminal device, a network type and/or network identity of a target network, the network type and/or network identity of the target network indicating whether the target network is a local network or a public land network, and being a local network type or local network identity of the target network when the target network is the local network; and
   performing, by the terminal device, communication through the target network;
   wherein determining, by the terminal device, the network type and/or network identity of the target network comprises:
   determining, by the terminal device, the network type and/or network identity of the target network based on at least one of:
   the network type and/or network identity supported or authorized by the terminal device, the network type and/or network identity supported by a current network,
   wherein the method further comprises:
   determining, by the terminal device, the network type and/or network identity supported by the current network based on information of a current cell.

2. The method according to claim 1, wherein determining, by the terminal device, the network type and/or network identity supported by the current network based on the information of the current cell comprises:
   reading, by the terminal device, the network type and/or network identity supported by the current network from system information of the current cell.

3. The method according to claim 1, wherein determining, by the terminal device, the network type and/or network identity supported by the current network based on the information of the current cell comprises:
   determining, by the terminal device, the network type and/or network identity supported by the current network based on frequency information of the current cell.

4. The method according to claim 3, wherein determining, by the terminal device, the network type and/or network identity supported by the current network based on the frequency information of the current cell comprises:
   determining the network type and/or network identity supported by the current network, based on a correspondence between at least one piece of the frequency information and at least one of the network type and/or network identity and the frequency information of the current cell.

5. The method according to claim 1, wherein determining, by the terminal device, the network type and/or network identity of the target network comprises:
   determining the network type and/or network identity of the target network based on a location area where the terminal device is currently located and a correspondence between at least one of the location area and at least one of the network type and/or network identity.

6. The method according to claim 1, wherein when the target network is the local network, the network identity comprises local network identity information.

7. The method according to claim 6, wherein the network identity comprises at least one of: information of an involved public land mobile network (PLMN), information of the local network type, information for indicating being the local network, and location area information.

8. The method according to claim 1, wherein the local network is a private network.

9. A chip, wherein the chip comprises: a processor, configured to call and run a computer program from a memory, so that a terminal device installed with the chip executes a wireless communication method comprising:
   determining, by the terminal device, a network type and/or network identity of a target network, the network type and/or network identity of the target network indicating whether the target network is a local network or a public land network, and being a local network type or local network identity of the target network when the target network is the local network; and performing, by the terminal device, communication through the target network;

wherein determining, by the terminal device, the network type and/or network identity of the target network comprises:

determining, by the terminal device, the network type and/or network identity of the target network based on at least one of:

the network type and/or network identity supported or authorized by the terminal device, the network type and/or network identity supported by a current network, wherein the method further comprises:

determining, by the terminal device, the network type and/or network identity supported by the current network based on information of a current cell.

10. A terminal device, comprising a processor and a memory, the memory is configured to store a computer program, and the processor is configured to call and run the computer program stored in the memory to execute a wireless communication method comprising:

determining, by the terminal device, a network type and/or network identity of a target network, the network type and/or network identity of the target network indicating whether the target network is a local network or a public land network, and being a local network type or local network identity of the target network when the target network is the local network; and performing, by the terminal device, communication through the target network;

wherein determining, by the terminal device, the network type and/or network identity of the target network comprises:

determining, by the terminal device, the network type and/or network identity of the target network based on at least one of:

the network type and/or network identity supported or authorized by the terminal device, the network type and/or network identity supported by a current network, wherein the method further comprises:

determining, by the terminal device, the network type and/or network identity supported by the current network based on information of a current cell.

11. The terminal device according to claim 10, wherein determining, by the terminal device, the network type and/or network identity supported by the current network based on the information of the current cell comprises:

reading, by the terminal device, the network type and/or network identity supported by the current network from system information of the current cell.

12. The terminal device according to claim 10, wherein determining, by the terminal device, the network type and/or network identity supported by the current network based on the information of the current cell comprises:

determining, by the terminal device, the network type and/or network identity supported by the current network based on frequency information of the current cell.

13. The terminal device according to claim 12, wherein determining, by the terminal device, the network type and/or network identity supported by the current network based on the frequency information of the current cell comprises:

determining the network type and/or network identity supported by the current network, based on a correspondence between at least one piece of the frequency information and at least one of the network type and/or network identity and the frequency information of the current cell.

14. The terminal device according to claim 10, wherein when the target network is the local network, the network identity comprises local network identity information.

15. The terminal device according to claim 14, wherein the network identity comprises at least one of: information of an involved public land mobile network (PLMN), information of the local network type, information for indicating being the local network, and location area information.

16. The terminal device according to claim 10, wherein the local network is a private network.

* * * * *